United States Patent
Lynar et al.

(10) Patent No.: US 9,354,684 B2
(45) Date of Patent: May 31, 2016

(54) UTILITY AWARE UNINTERRUPTIBLE POWER SUPPLIES FOR COMPUTING FACILITIES

(75) Inventors: Timothy M. Lynar, Carlton Vic (AU); Kent C. Steer, Carlton Vic (AU)

(73) Assignee: International Business Machines Corporation, Armonk, NY (US)

(*) Notice: Subject to any disclaimer, the term of this patent is extended or adjusted under 35 U.S.C. 154(b) by 500 days.

(21) Appl. No.: 13/592,565

(22) Filed: Aug. 23, 2012

(65) Prior Publication Data

US 2014/0058574 A1 Feb. 27, 2014

(51) Int. Cl.
- G06F 1/30 (2006.01)
- G06F 1/26 (2006.01)
- H02J 9/00 (2006.01)
- H02J 9/06 (2006.01)

(52) U.S. Cl.
CPC . G06F 1/30 (2013.01); H02J 9/005 (2013.01); H02J 9/06 (2013.01)

(58) Field of Classification Search
None
See application file for complete search history.

(56) References Cited

U.S. PATENT DOCUMENTS

| 6,381,742 | B2* | 4/2002 | Forbes et al. | 717/176 |
| 6,990,593 | B2* | 1/2006 | Nakagawa | 713/300 |
| 7,451,336 | B2 | 11/2008 | Manuell et al. | |
| 8,010,250 | B2 | 8/2011 | Borumand et al. | |
| 2003/0037150 | A1* | 2/2003 | Nakagawa | G06F 1/3203 709/229 |
| 2007/0025039 | A1 | 2/2007 | Sousa et al. | |
| 2010/0030392 | A1* | 2/2010 | Ferentz | H04L 12/10 700/295 |

OTHER PUBLICATIONS

Robinson et al., "Impact of Distributed Energy Resources on the Reliability of a Critical Telecommunications Facility", 2006, Sandia Report SAND2006-1277 NREL/TP-620-39561, pp. 24, 28, 41, and 44.*

'Migrating from Microsoft Windows 2000 Server to Windows Server 2003 with SP1 on Dell PowerEdge Servers' 2006, from Dell Power Solutions, Dell, Inc., p. 3.*

* cited by examiner

Primary Examiner — Mohammad Ali
Assistant Examiner — Bernard G Lindsay
(74) Attorney, Agent, or Firm — Tutunjian & Bitetto, P.C.; Louis J. Percello

(57) ABSTRACT

The present principles are directed to utility aware uninterruptible power supplies. A method includes evaluating services, including service combinations, from among a set of services provided by a computing facility operating under an energy constraint, to select a subset of services to power down or maintain powered so as to maximize a total utility value of the computing facility while operating under the energy constraint. The method further includes powering down, or maintaining power to, the selected subset of services.

25 Claims, 4 Drawing Sheets

UTILITY AWARE UNINTERRUPTIBLE POWER SUPPLIES FOR COMPUTING FACILITIES

BACKGROUND

1. Technical Field

The present principles relate generally to power supplies and, in particular, to utility aware uninterruptible power supplies.

2. Description of the Related Art

Currently in server installations and other computation facilities, when the electricity supply to the site is interrupted, a shutdown sequence is typically initiated. However, turning off all servers at once, or allowing all services to continue operation as normal until energy stores are depleted, is typically sub-optimal.

SUMMARY

According to an aspect of the present principles, there is provided a method. The method includes evaluating services, including service combinations, from among a set of services provided by a computing facility operating under an energy constraint, to select a subset of services to power down or maintain powered so as to maximize a total utility value of the computing facility while operating under the energy constraint. The method further includes powering down, or maintaining power to, the selected subset of services.

According to another aspect of the present principles, there is provided a system. The system includes a total utility value maximizer for evaluating services, including service combinations, from among a set of services provided by a computing facility operating under an energy constraint, to select a subset of services to power down or maintain powered so as to maximize a total utility value of the computing facility while operating under the energy constraint. The system further includes a power control device for powering down, or maintaining power to, the selected subset of services.

According to yet another aspect of the present principles, there is provided a method. The method includes determining a probability distribution of a length of power disrupting events. The method further includes determining, for each service in a set of services provided by a computing facility operating under an energy constraint, a respective utility value for each of services in the set, respective hardware and software dependencies of each of the services in the set, a respective power draw. The method also includes determining a remaining amount of power available at the computing facility while operating under the energy constraint. The method additionally includes evaluating the services, including service combinations, from among the set of services, to select a subset of services to power down or maintain powered so as to maximize a total utility value of the computing facility while operating under the energy constraint. The method further includes powering down, or maintaining power to, the selected subset of services.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to utility aware uninterruptible power supplies.

The present principles utilize user defined (and/or otherwise determined) utility values for each service on each server and, in the event of an electrical disruption, calculate the optimal service mix to maximize utility. In an embodiment, the calculation accounts for the estimated length of the outage, the distribution of the length of past outages, the power consumption attributable to each service, unavoidable power consumption attributable to each hardware item, and hardware and software dependencies. As used herein, the term "utility", also known as cardinal utility, is defined as a measure which is sought to be maximized in situations involving a choice and whose numerical scale bears meaning. The term "criticality" is defined as the degree of being of high importance. Hence, as is readily evident, a utility measure can exclude any measure of criticality, and be simply based on a preference irrespective of any criticality.

Thus, in the event of an electrical disruption, the present principles select services to power down and services to remain on to maximize the total utility provided by the computing system. The present principles use an optimization process to select the appropriate mix of services to maximize total utility given a number of services and their dependencies. In an embodiment, the objective of the optimization process is to maximize utility within an energy constraint with knowledge of the probability distribution of the length of power disrupting events. Such power disrupting events can include, for example, but are not limited to, power outages, prolonged voltage sags or spikes, or any alteration to main electricity that renders it unsuitable for use by the protected equipment. This allows us to maximize the utility of the system in the event of a power disruption.

Figure 1:
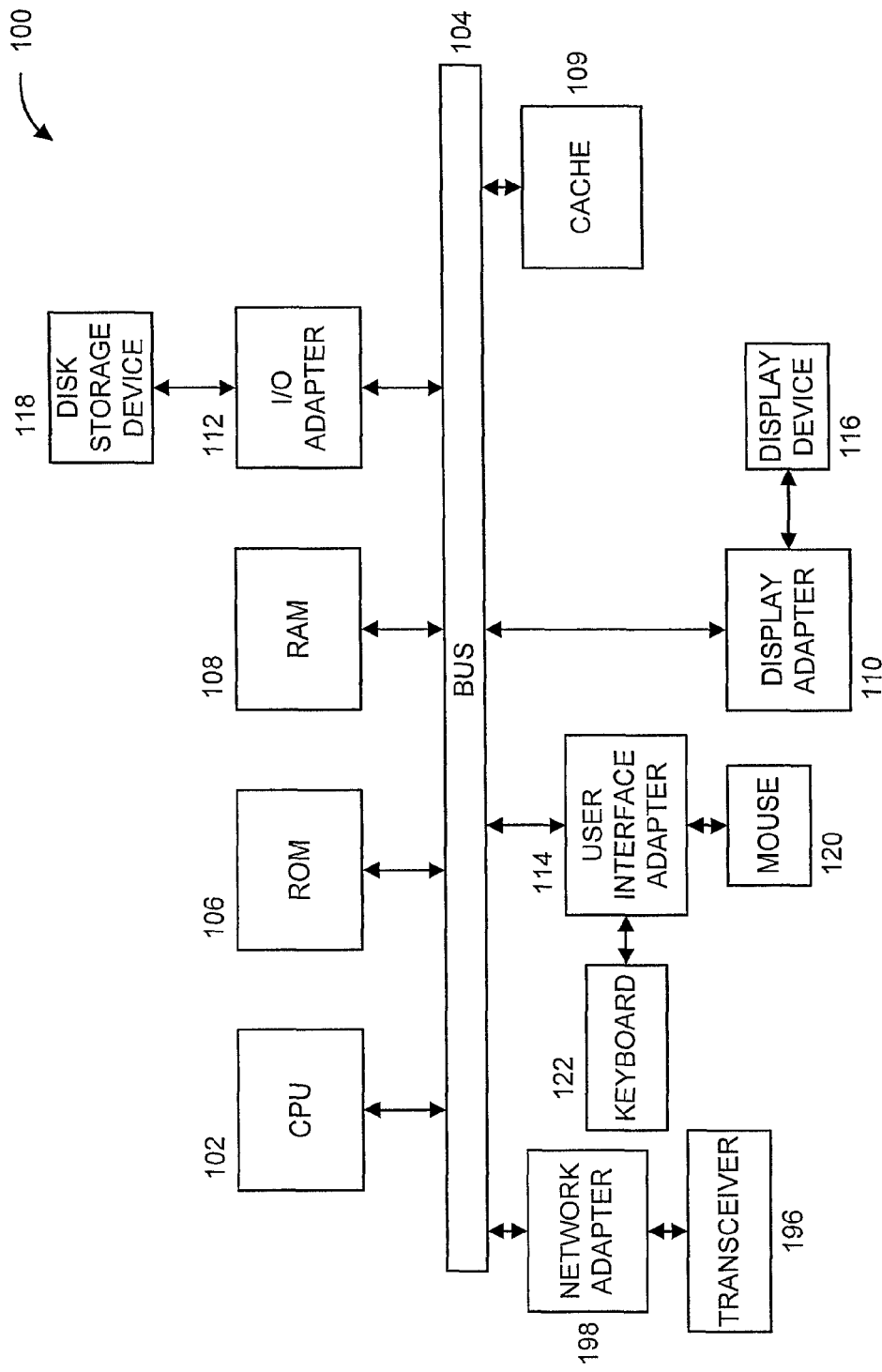
FIG. 1 shows an exemplary processing system 200 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A transceiver 196 is operatively coupled to system bus 104 by network adapter 198.

Of course, the processing system 100 may also include other elements (not shown), as readily contemplated by one of skill in the art, as well as omit certain elements. Additionally, elements of processing system 100 such as the keyboard 122 and mouse 120 may be omitted with a user interfacing with the processing system 100 via the transceiver 196 and/or some other element (shown or not shown) in FIG. 1. These and other variations of processing system 100 and the elements included therein are readily contemplated by one of ordinary skill in the art, while maintaining the spirit of the present principles.

Figure 2:
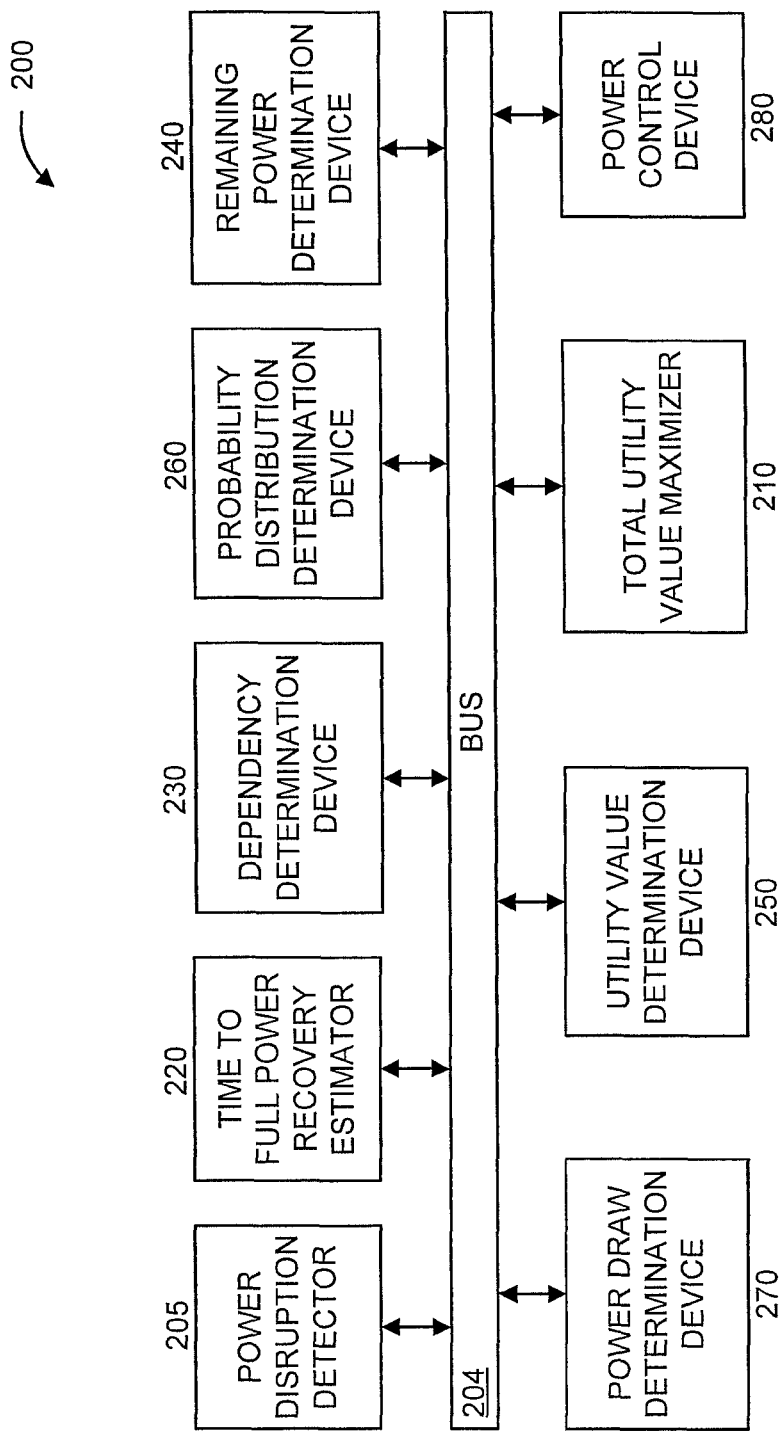
FIG. 2 shows an exemplary system 200 for providing a utility aware uninterruptible power supply, in accordance with an embodiment of the present principles.

Moreover, it is to be appreciated that system 200 described below with respect to FIG. 2 is essentially a system for implementing a respective embodiment of the present principles. Part or all of processing system 100 may be implemented in one or more of the elements of system 200.

Figure 3:
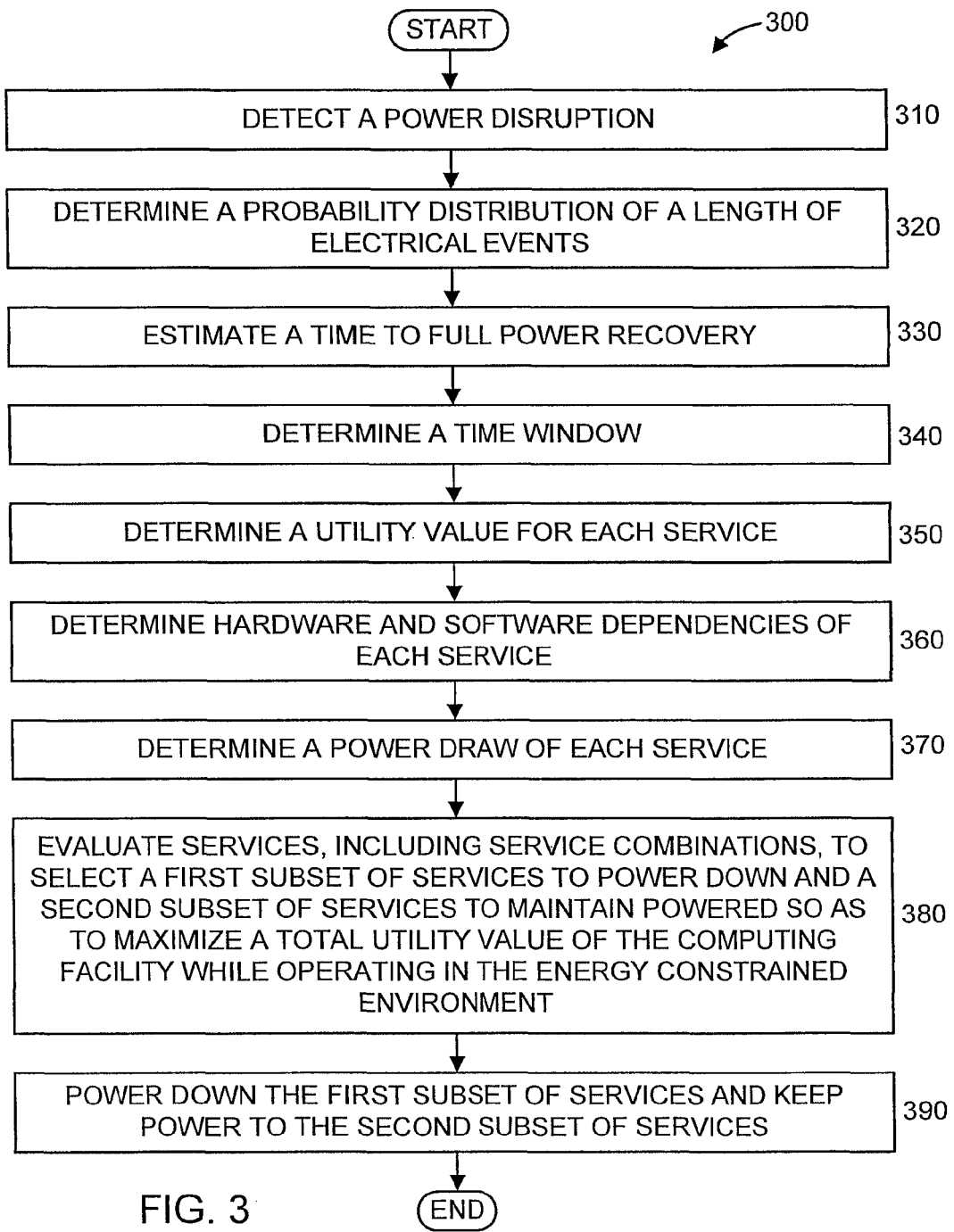
FIG. 3 shows an exemplary method 300 for providing a utility aware uninterruptible power supply, in accordance with an embodiment of the present principles.

Further, it is to be appreciated that processing system 100 may perform at least part of the methods described herein including, for example, parts of method 300 of FIG. 3.

FIG. 2 shows an exemplary system 200 for providing a utility aware uninterruptible power supply, in accordance with an embodiment of the present principles. The system 200 includes a power disruption detector 205, a total utility value maximizer 210, a time to full power recovery estimator 220, a dependency determination device 230, a remaining power determination device 240, a utility value determination device 250, a probability distribution determination device 260, a power draw determination device 270, and a power control device 280. The preceding elements are interconnected via a bus 204. It is to be appreciated that while the preceding elements are shown separately, in other embodiments, one or more of the preceding elements may be combined. These and other variations to system 200 are readily contemplated by one of ordinary skill in the art given the teachings of the present principles provided herein, while maintaining the spirit of the present principles.

The total utility value maximizer 210 determines a total utility value of a computing facility providing a set of services while operating in an energy constrained environment caused by a power disruption. To that end, in an embodiment, the total utility value maximizer 210 selects a first subset of services (from the set of services) to power down and a second subset of services (from the set of services) to remain powered so as to maximize the total utility value of the computing facility in the energy constrained environment. In another embodiment, only a single subset need be selected, with that subset designated to either include services to power down or services to maintain powered. As can be readily appreciated by one of ordinary skill in the art, the determination of a subset to power down can be used to determine the other subset to maintain powered, and vice versa, thus reducing the overall number of computations. That is, given a set of services, and a determination of a subset of the services to power down, the remaining services can be considered to be those that are to maintain power. Similarly, given a set of services, and a determination of a subset of the services to maintain powered, the remaining services can be considered to be those that are to be powered down.

In an embodiment, inputs to the total utility value maximizer 210 include, but are not limited to, at least one of a probability distribution of a length of power disrupting events, a utility value for each of the services in the set, hardware and software dependencies of each of the services in the set, a time to full power recovery, a remaining amount of power, and a power draw of each of the services in the set.

It is to be appreciated that the preceding inputs can be directly provided to the total utility value maximizer 210 or indirectly (e.g., as part of, or considered with respect to, another input directly provided to the total utility value maximizer 210).

In an embodiment, the total utility value maximizer 210 is tasked with implementing the power shutdown or maintaining of power to the various determined subsets. In another embodiment, for example, a subset of services to power down and another subset of services to keep powered are identified and provided to another entity (not shown) for implementing the shutting down and maintaining of power.

The power disruption detector 205 detects any disruptions to the power provided to the computing facility. Such disruptions are considered to place the computing facility in an energy constrained environment. In an embodiment, the power disruption detector 205 can be directly connected and/or otherwise interfaced (not shown) with the power provided to the computing facility. In an embodiment, the power disruption detector 205 can receive information indicating a power disruption without itself having to actually monitor the provided power. These and other variations to the manner in which power disruptions are detected are readily contemplated by one of ordinary skill in the art, and can be implemented in accordance with the present principles while maintaining the spirit of the present principles.

The time to full power recovery estimator 220 estimates a time to full power recovery of the computing facility, namely the time at which the power disruption has ceased and full power is available at the computing facility. In an embodiment, the time to full power recovery can be estimated from prior events. In an embodiment, the time to full power recovery can be estimated using, for example, mean, variance, and so forth. In an embodiment, "full power" refers to the amount of power sufficient to run all services at the computing facility or, at the least, the services that are intended to run at a given time. Thus, in an embodiment, the set of services can be all services at the computing facility. In another embodiment, the set of services can be a subset of all services, where the subset includes services expected to run at a given time when the computing facility is not under an energy constraint. For the purposes of selecting services to power down and services to maintain powered, the preceding described subset is hereinafter considered a set, with the selected services being a subset thereof.

The dependency determination device 230 determines the existence of any dependencies of each of the services. Such dependencies include, but are not limited to, hardware and software dependencies. Moreover, in an embodiment, the software dependencies include inter-service dependencies. For example, a particular service may depend on an output or intermediate result from another service. Accordingly, maintaining power to the former service while terminating power to the latter service can cause problems with the proper operation of the latter service and, thus, is considered in the optimization process.

The remaining power determination device 240 determines the remaining backup power that is available for each service combination.

The utility value determination device 250 determines a utility value for each of the services in the set. While shown as an element of system 200, it is to be appreciated that one or more utility values can also be provided by a user, as also shown by the direct input to the utility value determination device. The separate utility values for each services are then provided to the total utility value maximizer 210.

The probability distribution determination device 260 determines the probability distribution of a length of power disrupting events.

The power draw determination device 270 determines the power draw of the services, either singly or in combination(s).

The power control device 280 powers down the first subset of services and maintains power to the second subset of services.

FIG. 3 shows an exemplary method 300 for providing a utility aware uninterruptible power supply, in accordance with an embodiment of the present principles. The method 300 is performed with respect to a computing facility providing a set of services while operating in an energy constrained environment caused by a power disruption.

At step 310, a power disruption is detected. The power disruption results in an energy constrained environment being imposed on the computing facility.

At step 320, the probability distribution of a length of power disrupting events is determined.

At step 330, a time to full power recovery is estimated. In an embodiment, the time to full power recovery can be estimated, for example, responsive to prior power disruption events.

At step 340, a time window is determined. The time window is used to compare different service combinations over a given time period. In an embodiment, the time window commences at the start time of the power disruption and ceases at a time subsequent to the end time of the power disruption. Of course, the time window can start and end at other times, as readily contemplated by one of ordinary skill in the art, given the teachings of the present principles provided herein.

At step 350, a utility value for each service in the set is determined. In an embodiment, one or more of the respective utility values are user supplied. It is to be appreciated that such utility values for each service can be provided in advance of a power disrupting event.

At step 360, hardware and software dependencies of each of the services in the set are determined.

At step 370, a power draw of the services is determined. The power draw may be determined individually for each service and/or with respect to one or more combinations of services.

At step 380, services, including various service combinations, are evaluated (e.g., compared) to select a first subset of services to power down and a second subset of services to maintain powered so as to maximize a total utility value of the computing facility while operating in the energy constrained environment caused by the power disruption. In an embodiment, step 380 is performed so as to compare every possible service combination, i.e., an exhaustive comparison. In other embodiments, less than every possible service combination is evaluated. In the latter case, one or more criterion can be used to limit the number of service combinations to be evaluated. It is to be appreciated that step 380 is performed with respect to at least one of the following inputs: a probability distribution of a length of power disrupting events, a utility value for each of the services in the set, hardware and software dependencies of each of the services in the set, a time to full power recovery, a remaining amount of power, and a power draw of each of the services in the set. It is to be appreciated that the preceding list of inputs is not exhaustive and, thus, other inputs can also be used in accordance with the teachings of the present principles, while maintaining the spirit of the present principles.

At step 390, the first subset of services is powered down and the second subset of services is kept powered.

In a preferred embodiment, the present principles use a process of exhaustive search to select the appropriate mix of services to maximize total utility given a number of services and dependencies with fixed power consumption. In the embodiment, the objective of the optimization is to maximize utility within an energy constraint with knowledge of the probability distribution of the length of power disrupting events.

If we limit ourselves to making a single decision at the time of power outage, namely the combination of services to operate while running on stored energy, then we can calculate the time s at which these services would exhaust the stored energy K as follows:

$$s(x) = K \bigg/ \sum_{i=1}^{N} q_i x_i \qquad (1)$$

where N denotes the number of services, $q_i$ denotes the power required to run a given service, and $x_i$ denotes a binary variable indicating whether or not the service is in use (1=on, 0=off).

To compare different service combinations we need to choose some window of time [0, h] over which we will calculate the cumulative utility. As it is presumed that the power control device plays no role in the operation of services prior to the power outage, we select the starting point for the window to be the time at which the outage begins. The end of the time window h should be chosen to occur after all likely relevant events.

In energy constrained settings which arise from power outages we can treat, for the purposes of this formulation, the time to power restoration as a random variable r. It is to be appreciated that while one or more embodiments are described herein where it is presumed that r is normally distributed with a mean of $\mu$ and a standard deviation of $\sigma$, the present principles can be adapted to any distribution.

To handle uncertainty we use the expected utility measure as our objective function. In an embodiment, the expected utility weighs the utility of every possible outcome by the probability of that outcome occurring. Such an outcome may be the loss of one or many computing resources or the services they provide, and so forth.

We will now describe the steps involved in obtaining an expression for the expected utility of a solution, in accordance with an embodiment of the present principles. The utility of a valid solution (a subset of services which satisfies the dependency constraint) depends on whether or not the power is restored before the energy store is exhausted. The utility U of a valid solution is calculated as follows:

$$U(x, r) = \begin{cases} u_n \cdot h & \text{if } r \le 0, \\ u(x)r + u_n \cdot (h-r) & \text{if } 0 < r \le s(x), \\ u(x)s(x) + u_n \cdot (h-r) & \text{otherwise.} \end{cases} \qquad (2)$$

where s, r, and x are as defined above, u represents utility, $u_n$ represents total utility, and h represents the end of the window of time we are concerned with.

It should be noted that the first condition is only for completeness. In practice, it is meaningless for the power to be restored before the outage occurs.

Having made the presumption that $r \sim \mathcal{N}(\mu, \sigma^2)$, wherein $\mathcal{N}$ denotes a normal distribution, we can use the following analytic expression for the probability density function $f$ of a generalized normal distribution:

$$f(r; \mu, \sigma^2) = \frac{1}{\sqrt{2\pi\sigma^2}} \exp\left(-\frac{(r-\mu)^2}{2\sigma^2}\right). \quad (3)$$

We will use the following cumulative distribution function F:

$$F(r; \mu, \sigma^2) = \frac{1}{2}\left[1 + \mathrm{erf}\left(\frac{r-\mu}{\sqrt{2\sigma^2}}\right)\right], \, r \in \mathfrak{R} \quad (4)$$

where $\mathfrak{R}$ denotes the set of real numbers, and erf denotes the standard error function.

In an embodiment, the expected utility E is by definition the sum of the product of the probability of the possible outcomes and their respective utilities. In the case of a continuous probability distribution and a continuous utility function, with respect to the random variable r, we take the integral of the same product as follows:

$$E(U(x)) = \int_0^h f(r; \mu, \sigma^2) \cdot U(x, r) \cdot dr \quad (5)$$

Substituting in Equation (2) and Equation (3) allows us to perform the integration which leads to the following expression:

$$E(U(x)) = F(h) \cdot (u(x)s(x) + u_n(h - \mu)) + \quad (6)$$
$$F(s(x)) \cdot (u(x)\mu - u(x)s(x)) - F(0) \cdot (u(x)\mu + u_n(h - \mu)) +$$
$$f(h) \cdot \sigma^2 u_n - f(s(x)) \cdot \sigma^2 u(x) + f(0) \cdot \sigma^2 (u(x) - u_n)$$

To aid in the understanding of the present principles, we now describe an example situation to which the present principles can be applied, in accordance with an embodiment of the present principles. Consider an industrial computational facility. The facility hosts a range of services which provide varying degrees of utility to the operator. The mean power draw of each service is also known, as are the services upon which each depends. Table 1 below shows some example services.

TABLE 1

| ID | SERVICE | UTILITY | DEPENDENCIES | MEAN POWER (KW) |
|---|---|---|---|---|
| 0 | system | 0 | — | 0.6 |
| 1 | authentication | 1 | 0 | 0.7 |
| 2 | database | 2 | 0 | 0.2 |
| 3 | gaming | 3 | 0, 2 | 1.2 |
| 4 | rendering | 4 | 0, 2 | 2.4 |
| 5 | visualization | 5 | 0, 1, 4 | 2.6 |
| 6 | web | 2 | 0, 1, 5 | 2.0 |
| 7 | backup | 1 | 0, 2 | 2.0 |

Figure 4:
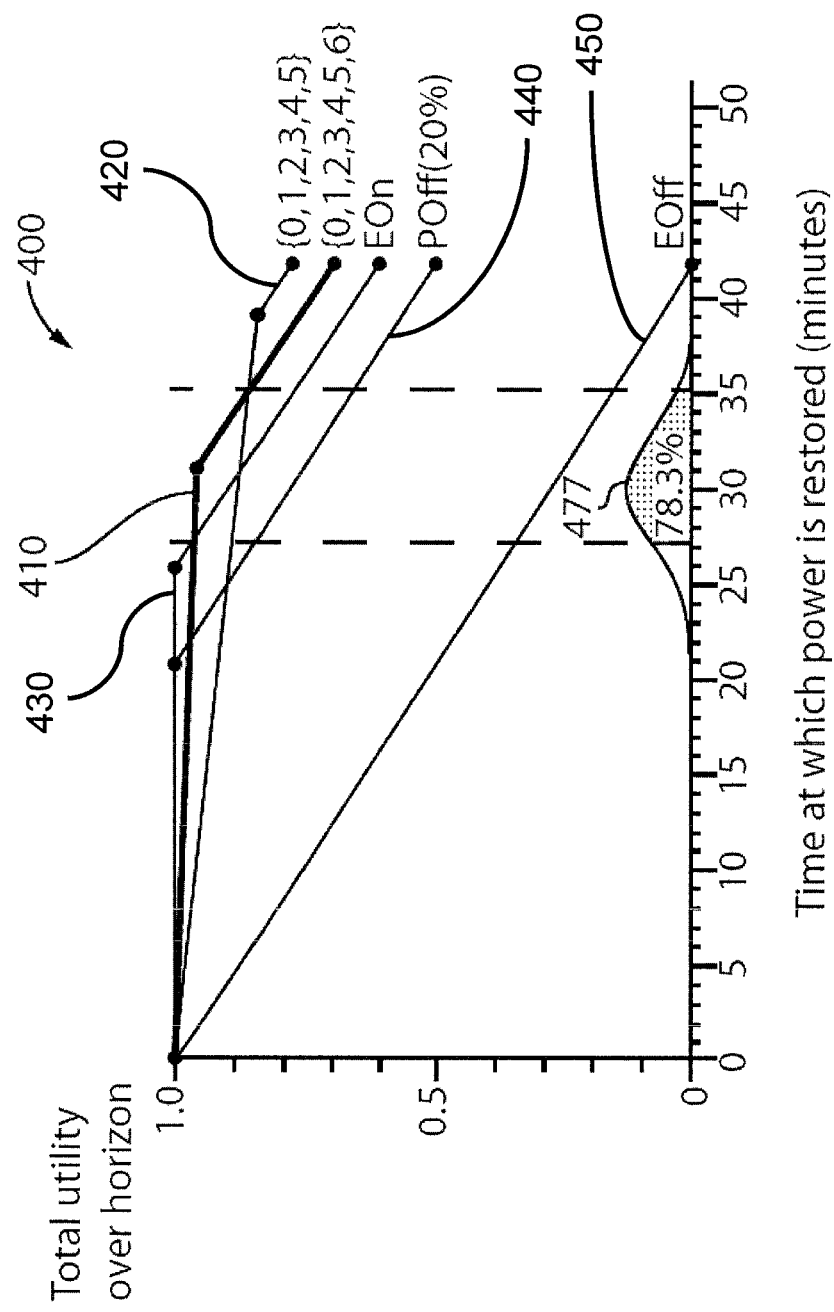
FIG. 4 shows a plot 400 of the time at which power is restored versus the total utility, in accordance with an embodiment of the present principles.

In the event of a power outage (e.g., a regional black-out) the facility must decide which services to power down and which to continue running from the uninterruptible power supply. The time to recovery can be estimated (mean, variance) based on prior events. The total energy obtainable from the uninterruptible power supply is 5 kWh. In FIG. 4, we present the results of applying an embodiment of the present principles to this scenario.

FIG. 4 shows a plot 400 of the time at which power is restored (in minutes) versus the total utility (on a scale from 0.0 to 1.0), in accordance with an embodiment of the present principles. The line 410 represents the strategy selected by our expected utility approach. The total utility of any strategy depends on time at which power is actually restored. Prior to selecting a strategy, we only know the probability distribution of the restoration time. FIG. 4 allows us to see how well this strategy will perform under all possible outcomes. The curve 477 is the probability density function for the restoration time.

From the 27$^{th}$ minute until the 35$^{th}$ minute, the chosen solution will deliver the optimal utility (line 410 is above all other lines (i.e., lines 420, 430, 440, and 450) over this window of time). This represents 78.3 percent of recovery times based on the normal distribution. If the recovery occurs before the 27$^{th}$ minute, then the strategy of keeping all services operating would have been the best. However, in an embodiment, the difference between this solution and our chosen solution is never very large. Our solution is never less than 99.6 percent of the "all on" solution. Also, the power is only restored after the 35$^{th}$ minute on less than 5 percent of occasions.

We also show a few contender strategies, which are labeled according to the set of services which are operated, as follows: "EOn" is the "everything on" solution; "POff" is the strategy of powering everything off when only 20 percent of the UPS remains; "EOff" is the solution which turns everything off the moment the disruption is detected.

As will be appreciated by one skilled in the art, aspects of the present principles may be embodied as a system, method or computer program product. Accordingly, aspects of the present principles may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present principles may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present principles may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present principles are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present principles. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    evaluating services by a processor of a computing facility operating under an energy constraint associated with a power disruption, including service combinations, from among a set of two or more services provided by the computing facility, including calculating an optimal service mix for service combinations to select a subset of services, each service having a respective utility value and a respective fixed power consumption, and powering down, or maintaining power to, the selected subset of services, while operating under the energy constraint, so as to maximize a total utility value of the computing facility;
    wherein the total utility value is determined based on:
        the respective utility value for each of the services in the subset, a probability distribution of a length of power disrupting events, and a time window, the time window commencing at a start time of the power disruption and ceasing at an estimated end time associated with the power disruption.

2. The method of claim 1, wherein the subset of services is selected further based on respective hardware and software dependencies of each of the two or more services in the set.

3. The method of claim 2, wherein the respective utility value for at least one of the two or more services in the set is user defined.

4. The method of claim 2, wherein the subset of services is further selected responsive to a time to full power recovery.

5. The method of claim 4, wherein the time to full power recovery is estimated based on prior power disruption events.

6. The method of claim 4, wherein the total utility value is determined using an objective function that models the time to full power recovery using a random variable.

7. The method of claim 2, wherein the software dependencies comprise inter-service dependencies.

8. The method of claim 2, wherein the subset of services is further selected responsive to a respective power draw of the services and the service combinations.

9. The method of claim 2, wherein the subset of services is further selected responsive to a remaining power at the computing facility.

10. The method of claim 1, wherein the estimated end of the time window is a time subsequent to an end time of the power disruption.

11. The method of claim 10, wherein said evaluating step comprises comparing different service combinations over the time window.

12. The method of claim 1, the total utility value is a total cardinal utility value that excludes any measure of criticality.

13. The method of claim 1, wherein the method is implemented in a computer-executable program tangibly embodied on a non-transitory computer readable storage medium.

14. A system, comprising:
a total utility value maximizer including a processor for evaluating services by a computing facility operating under an energy constraint associated with a power disruption, including service combinations, from among a set of two or more services provided by the computing facility, including calculating an optimal service mix for service combinations to select a subset of services, each service having a respective utility value and a respective fixed power consumption, and powering down, or maintaining power to, the selected subset of services while operating under the energy constraint, so as to maximize a total utility value of the computing facility; and
a power control device for powering down, or maintaining power to, the selected subset of services,
wherein the total utility value is determined based on:
the respective utility value for each of the services in the subset,
a probability distribution of a length of power disrupting events, and a time window, the time window commencing at a start time of the power disruption and ceasing at an estimated end time associated with the power disruption.

15. The system of claim 14, wherein the subset of services is selected further based on respective hardware and software dependencies of each of the two or more services in the set.

16. The system of claim 15, wherein the respective utility value for at least one of the two or more services in the set is user defined.

17. The system of claim 15, wherein the subset of services is further selected responsive to a time to full power recovery.

18. The system of claim 17, wherein the time to full power recovery is estimated based on prior power disruption events.

19. The system of claim 17, wherein the total utility value is determined using an objective function that models the time to full power recovery using a random variable.

20. The system of claim 15, wherein the software dependencies comprise inter-service dependencies.

21. The system of claim 15, wherein the subset of services is further selected responsive to a remaining power at the computing facility.

22. The system of claim 14, wherein the estimated end of the time window is a time subsequent to an end time of the power disruption.

23. The system of claim 22, wherein said total utility value maximizer compares different service combinations over the time window.

24. The system of claim 14, wherein the energy constraint is caused by the power disruption.

25. A method, comprising:
determining a total utility value for services of a computing facility, including service combinations, from among a set of services, based on:
determining a probability distribution of a length of power disrupting events,
determining a time window, the time window commencing at a start time of a power disruption and ceasing at an estimated end time associated with the power disruption,
determining, by a processor of a computing facility, a respective utility value for each service in a subset of services based on: respective hardware and software dependencies, and a respective fixed power consumption;
determining a remaining amount of power available at the computing facility while operating under an energy constraint associated with the power disruption;
evaluating the service combinations by a processor of the computing facility operating under an energy constraint to determine an optimal service mix that maximizes the total utility value for the remaining amount of power; and
selecting the subset of services that provides the optimal service mix to power down or maintain powered, while operating under the energy constraint associated with the power disruption.

* * * * *